United States Patent
Schoenberg et al.

(10) Patent No.: US 9,721,380 B2
(45) Date of Patent: Aug. 1, 2017

(54) REMOVING REDUNDANT VOLUMETRIC INFORMATION FROM A VOLUME-BASED DATA REPRESENTATION

(71) Applicant: Microsoft Technology Licensing, LLC, Redmond, WA (US)

(72) Inventors: Michael John Schoenberg, Seattle, WA (US); Michael Jason Gourlay, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 14/697,407

(22) Filed: Apr. 27, 2015

(65) Prior Publication Data
US 2016/0314612 A1 Oct. 27, 2016

(51) Int. Cl.
*G06T 15/40* (2011.01)
*G06T 19/20* (2011.01)
*G06T 15/30* (2011.01)
*G06T 15/08* (2011.01)

(52) U.S. Cl.
CPC .................... *G06T 15/40* (2013.01)

(58) Field of Classification Search
CPC ......... G06T 15/30; G06T 15/08; G06T 15/40; G06T 19/20
USPC ........................ 345/419, 421, 424
See application file for complete search history.

(56) References Cited

U.S. PATENT DOCUMENTS

| | | | |
|---|---|---|---|
| 6,466,892 B2* | 10/2002 | Fujii | G06T 17/205 345/418 |
| 7,327,362 B2 | 2/2008 | Grau | |
| 7,538,764 B2 | 5/2009 | Salomie | |
| 8,610,706 B2 | 12/2013 | Zhou et al. | |
| 2003/0034973 A1* | 2/2003 | Zuiderveld | G06T 15/08 345/424 |
| 2003/0067461 A1 | 4/2003 | Fletcher et al. | |
| 2006/0202989 A1* | 9/2006 | Yinghui | G06T 15/08 345/424 |
| 2013/0034276 A1 | 2/2013 | Hibbard | |

FOREIGN PATENT DOCUMENTS

WO WO-2006027339 3/2006

OTHER PUBLICATIONS

"Robot Assisted 3D Shape Acquisition by Optical Systems", Retrieved From: <https://robotics101zz.wordpress.com/2014/03/12/robot-assisted-3d-shape-acquisition-by-optical-systems/> Feb. 23, 2015, Mar. 12, 2014, 22 pages.

(Continued)

*Primary Examiner* — Kimberly A Williams

(57) ABSTRACT

An environment includes different objects that are each made up of one or more 3-dimensional volumes. These volumes can overlap one another, resulting in situations in which a particular volume that is overlapped is redundant and can be removed from the set of volumes describing the environment. A two-phase approach is applied in determining whether a particular volume is redundant. In the first phase, a candidate list of source volumes is quickly generated with a small amount of computational effort. In the second phase, the source volumes on the candidate list are analyzed to determine whether the particular volume is fully overlapped by one or a combination of the source volumes.

20 Claims, 11 Drawing Sheets

(56) References Cited

OTHER PUBLICATIONS

"Meshing Point Clouds", Retrieved From: <http://meshlabstuff.blogspot.in/2009/09/meshing-point-clouds.html> Feb. 23, 2015, Sep. 7, 2009, 8 pages.
Guarnieri,"A Volumetric Approach for 3D Surface Reconstruction", In Proceedings of CIPA XX International Symposium, Sep. 26, 2005, 6 pages.
Hansen,"The Visualization Handbook", Available at: <http://iate.oac.uncor.edu/%7Emanuel/libros/Optics/The%20Visualization%20Handbook%20-Charles%20D.%20Hansen%20,%20Chris%20R.%20Johnson.pdf>, 2005, 981 pages.
Keeter,"Hierarchical Volumetric Object Representations for Digital Fabrication Workflows", In Proceedings of 40th International Conference and Exhibition on Computer Graphics and Interactive Techiniques, Jun. 2013, 114 pages.
Neugebauer,"Adaptive Triangulation of Objects Reconstructed From Multiple Range Images", In Proceedings: IEEE Visualization Late-Breaking Hot Topics Session, Oct. 1997, 4 pages.
Shin,"Triangular Mesh Generation of Octrees of Non-Convex 3D Objects", In Proceedings of the 18th International Conference on Pattern Recognition, vol. 03, Aug. 20, 2006, 4 pages.
Stelldinger,"3D Object Digitization: Majority Interpolation and Marching Cube", In Proceedings of the 18th International Conference on Pattern Recognition, vol. 01 Available at: <http://www.cis.temple.edu/~latecki/Papers/smooth2smooth3D_icpr2.pdf>, Aug. 20, 2006, 4 pages.

\* cited by examiner

REMOVING REDUNDANT VOLUMETRIC INFORMATION FROM A VOLUME-BASED DATA REPRESENTATION

BACKGROUND

As computing technology has advanced, the availability of computers and the manners in which computers are used have expanded. One such use is to display a graphical representation of some environment. Although such uses can provide various benefits, they are not without their problems. One such problem is that large amounts of computer processing power are needed to process the data in order to determine the proper graphical representation to display, which can result in expensive computers or computers that operate slowly in displaying the environment, resulting in user frustration with their computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more embodiments, multiple volumes in an environment are obtained, each volume being a 3D volume described by a 3D grid of multiple voxels. One of the multiple volumes is selected to be a target volume, and in a first phase a candidate list of multiple source volumes is identified. In a second phase, which of multiple sub-volumes of the target volume are overlapped by at least one of the source volumes in the candidate list are identified. A determination is made that the target volume is fully overlapped by at least one source volume in response to all of the sub-volumes being overlapped by at least one source volume, and the target volume is excluded from further processing in response to the target volume being fully overlapped by at least one source volume.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
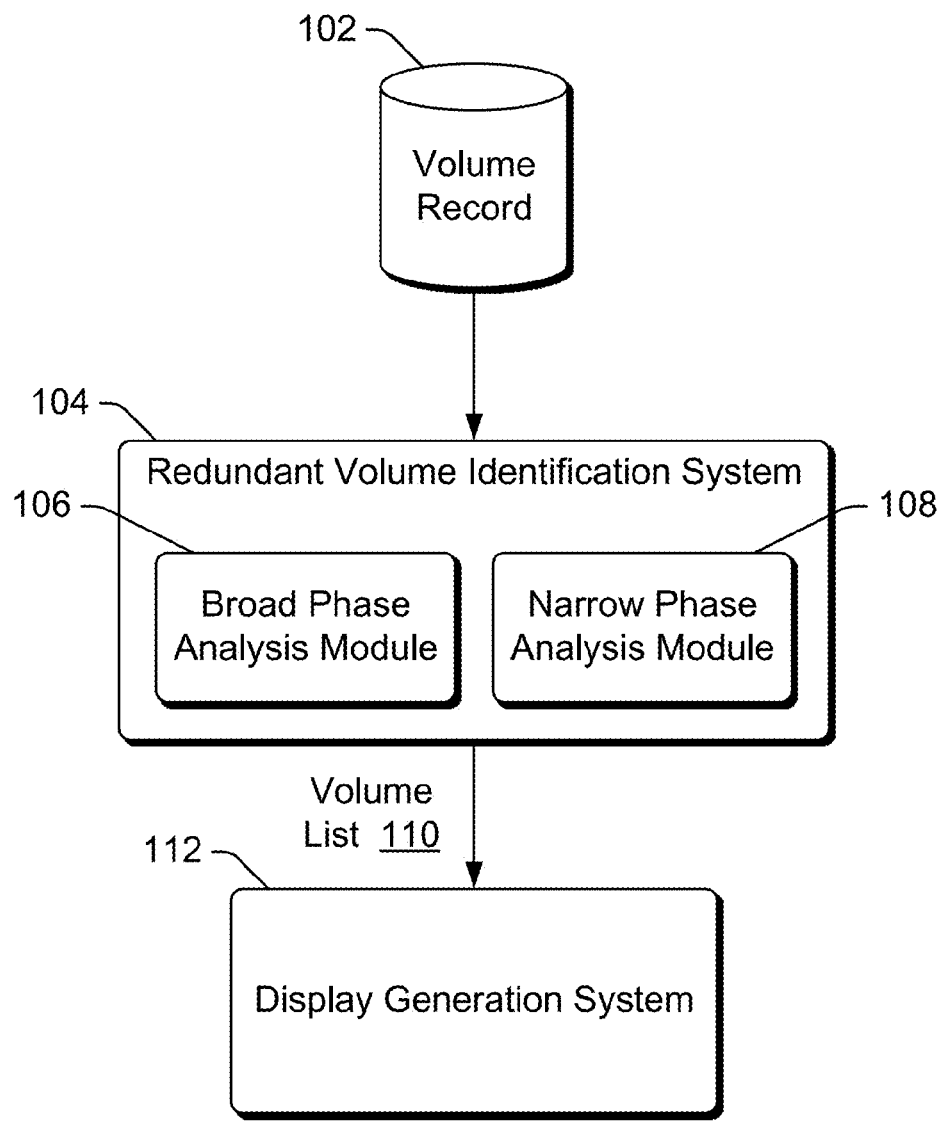
FIG. 1 is a block diagram illustrating an example system implementing the removing redundant volumetric information from a volume-based data representation in accordance with one or more embodiments.

Removing redundant volumetric information from a volume-based data representation is discussed herein. The volume-based data representation represents an environment using 3-dimensional (3D) volumes. The volume-based data representation can be used in various scenarios, such as for surface reconstruction, which refers to generating a geometric mesh corresponding to a point cloud (a set of data points). The 3D volumes can be processed (e.g., analyzed, manipulated, etc.) in a variety of different manners, such as to generate a geometric mesh, which can optionally be displayed. The environment can be a real world physical location, computer-generated (e.g. virtual) objects, or a combination thereof. For example, the environment can be a real world physical location augmented with virtual objects generated by a computer.

Numerous different volumes (e.g., cubes) can be included in the environment, and these volumes can overlap one another. A particular volume being overlapped by another volume refers to at least part of the particular volume being contained in or subsumed by the other volume. Situations can arise in which one or more other volumes fully overlap the particular volume, resulting in the particular volume not needing to be included in the volume-based data representation. The particular volume need not be included in the volume-based data representation because the particular volume is fully contained in or subsumed by the one or more other volumes, so the particular volume does not represent any space in the environment that is not represented by the one or more other volumes. As such, a volume that is fully overlapped by one or more other volumes is also referred to as being redundant.

The techniques discussed herein allow redundant volumes to be deleted or removed from a set of volumes describing the environment. The redundant volume can be removed because a redundant volume does represent any space in the environment that is not represented by one or more other volumes and contains no information not contained within other volumes. By deleting or removing the redundant volume from the set of volumes describing the environment, processing power and time to process the volume when performing surface reconstruction need not be expended. This results in reducing the load on one or more processors that are processing the 3D volumes in the environment, and increasing the speed at which the 3D volumes in the environment can be processed.

The techniques discussed herein apply a two-phase approach in determining whether a volume is redundant. To determine whether a given volume, referred to as the target volume, is redundant, the two-phase approach determines whether the target volume is at least partially overlapped by one or more other volumes referred to as source volumes. In the first phase, a candidate list of source volumes is generated. The first phase operates to quickly identify the candidate list with a small amount of computational effort, optionally identifying source volumes that at least partially overlap the target volume without necessarily identifying how the source volumes overlap the target volume or by how much the source volumes overlap the target volume.

In the second phase, the source volumes on the candidate list are analyzed to determine whether the target volume is fully overlapped by one or a combination of the source volumes. If the target volume is fully overlapped, then the target volume is redundant. This analysis in the second phase is based on voxels of the target volume. A voxel is a value (e.g., a color value) in a grid in 3D space, and a target volume is made up of numerous voxels (a 3D grid of voxels defines the volume). This determination of whether the target volume is fully overlapped in the second phase is made based on whether each voxel of the target volume is overlapped by at least one source volume. A particular voxel being overlapped by a source volume refers to the particular voxel being contained in or subsumed by the source volume. If all voxels in the target volume are overlapped by at least one source volume then the target volume is fully overlapped, and if at least one voxel in the target volume is not overlapped by a source volume then the target volume is not fully overlapped.

FIG. 1 is a block diagram illustrating an example system 100 implementing the removing redundant volumetric information from a volume-based data representation in accordance with one or more embodiments. The system 100 can be implemented using a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), a television or other display device, an automotive computer, and so forth. Thus, the system 100 may be implemented by computing devices ranging from full resource devices with substantial memory and processor resources (e.g., personal computers, game consoles) to low-resource devices with limited memory and/or processing resources (e.g., traditional set-top boxes, hand-held game consoles).

In one or more embodiments, the system 100 is implemented using a single computing device. Alternatively, the system 100 can be implemented using multiple computing devices (which may be the same or different types of computing devices). In situations in which the system 100 is implemented using multiple computing devices, the multiple computing devices can communicate with one another via any of a variety of different connections. The multiple computing devices can be communicatively coupled to one another via a wired or wireless connection, such as a USB (universal serial bus) connection, a wireless USB connection, an infrared connection, a Bluetooth connection, a DisplayPort connection, a PCI (a peripheral component interconnect) Express connection, and so forth. The multiple computing devices can alternatively or additionally be communicatively coupled to one another via a data network, such as the Internet, a local area network (LAN), a public telephone network, an intranet, other public and/or proprietary networks, combinations thereof, and so forth.

The system 100 includes a volume record 102 and a redundant volume identification system 104. The volume record 102 is a record (e.g., a list, table, or other data structure) of volumes that are included in an environment for which a display is to be generated. The volumes included in the volume record 102 are identified by one or more additional systems or devices that are typically separate from the redundant volume identification system 104. In one or more embodiments, the volumes included in the volume record 102 include multiple volumes that are computer-generated to augment a view of a real world physical location. For example, objects that describe a virtual whiteboard and markers that are displayed on top of a view of a real world physical location can be generated by a computer, and the volumes in the volume record 102 are volumes that describe that virtual whiteboard and markers. Additionally or alternatively, the volumes included in the volume record 102 can be volumes that represent objects in a real world physical location (e.g., desks, tables, chairs, cars, etc.), and/or volumes that represent objects in a computer-generated environment (e.g., a virtual world, a gaming world, etc.) independent of any real world physical locations.

Each volume in the volume record 102 is a 3D convex shape that includes multiple voxels organized in a 3D grid. In one or more embodiments, each volume is a cube or other rectangular prism. Additionally or alternatively, one or more volumes in the volume record 102 can take other 3D convex geometric shapes, such as a triangular prism, cylinder, cone, and so forth.

Each volume in the volume record 102 also includes a location of the volume within a local coordinate system used by the volume itself. Each volume uses its own local coordinate system to describe its location. The volumes themselves are not described using a common global coordinate system. Although a common global coordinate system is not used, the relationship of the different local coordinate systems to one another is known. This relationship between two local coordinate systems can be obtained in various manners, such as from the device or service that provided the volumes in the volume record 102. Thus, each of the different volumes can be projected into the local coordinate system of any of the other volumes, or into some other coordinate system.

Each of the volumes in the volume record 102 can have any orientation within its local coordinate system and relative to the other volumes. Each of the volumes in the volume record 102 also includes data indicating the orientation of the volume in the environment.

The redundant volume identification system 104 includes a broad phase analysis module 106 and a narrow phase analysis module 108. For each of one or more volumes in the volume record 102, the redundant volume identification system 104 implements a two-phase approach to determine whether the target volume is redundant. The broad phase analysis module 106 implements the first of the two phases, quickly identifying (e.g., more quickly than would be identified by the narrow phase analysis module 108, or within a threshold amount of time) with a small amount of computational effort (e.g., less computational effort than would be expended by the narrow phase analysis module 108 to perform the identification) a candidate list that includes source volumes. These source volumes are optionally source volumes that at least partially overlap the target volume. The narrow phase analysis module 108 implements the second of the two phases, analyzing the source volumes on the candidate list to determine whether the target volume is fully overlapped by one or a combination of the source volumes.

The redundant volume identification system 104 outputs a volume list 110, which is subset of volumes in the volume record 102, optionally to a display generation system 112. A volume that is fully overlapped by one or more source volumes is referred to as a redundant volume, and does not contain any unique information not contained with the one or more source volumes. Accordingly, the redundant volume can be deleted or removed from the volume list 110 because the information contained in the redundant volume can be obtained from other volumes in the volume list 110.

The display generation system 112 processes the volumes in the volume list 110 to generate a model of the environment that can be displayed. Various different types of models can be generated, such as triangle mesh or quadrilateral mesh models, using any of a variety of public and/or proprietary techniques, and the display generation system 112 processes the volumes in different manners based on the type of model being generated. Given the model, the display generation system 112 can generate the display in a variety of different manners using any of a variety of public and/or proprietary techniques. Volumes in the volume record 102 that are determined, by the redundant volume identification system 104, to be fully overlapped by one or a combination of the source volumes are excluded from the subset of volumes and are not included in the volume list 110. By excluding those volumes that are fully overlapped from the volume list 110, the excluded volumes are not used by the display generation system 112 in generating the model of the environment. The volume list 110 is provided to one or more other modules or systems to generate the display.

The system 100 optionally includes one or more other processing systems, in addition to or in place of the display generation system 112. These processing systems can perform various operations on the volumes in the volume list 110. For example, these processing systems can perform simulations on the environment that includes the volumes, or can perform other processing on or analysis of the volumes.

Figure 2:
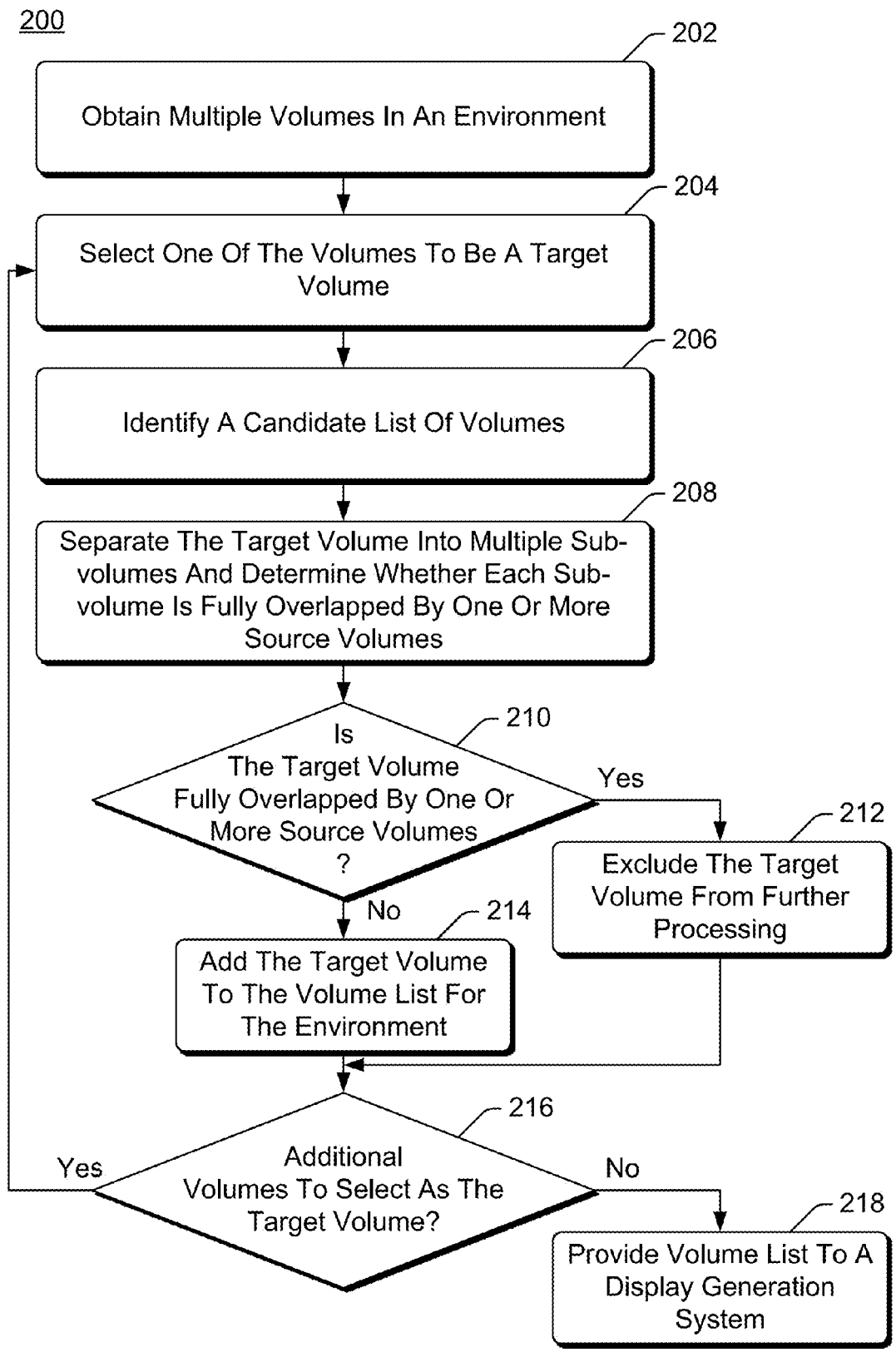
FIG. 2 is a flowchart illustrating an example process for removing redundant volumetric information from a volume-based data representation in accordance with one or more embodiments.

FIG. 2 is a flowchart illustrating an example process 200 for removing redundant volumetric information from a volume-based data representation in accordance with one or more embodiments. Process 200 is carried out by one or more devices implementing a redundant volume identification system, such as redundant volume identification system 104 of FIG. 1, and can be implemented in software, firmware, hardware, or combinations thereof. Process 200 is shown as a set of acts and is not limited to the order shown for performing the operations of the various acts. Process 200 is an example process for removing redundant volumetric information from a volume-based data representation; additional discussions of removing redundant volumetric information from a volume-based data representation are included herein with reference to different figures.

In process 200, multiple volumes in an environment are obtained (act 202). The multiple volumes are identified in a volume record, and are the volumes that are included in an environment for which a display is to be generated. The multiple volumes can be obtained from a variety of different sources, such as one or more systems, devices, modules, and so forth.

One of the obtained multiple volumes is selected to be a target volume (act 204). The target volume refers to a volume that is being analyzed to determine whether the volume is fully overlapped by one or more other volumes (referred to as source volumes) of the multiple volumes. If the target volume is fully overlapped by one or more other volumes, then the target volume is redundant and can be excluded from the list of volumes used to generate the display, as discussed in more detail below. The target volume can be selected in any of a variety of manners, such as based on a size of (a number of voxels included in) the target volume (e.g., the target volume with the most or least voxels is selected), in a random or pseudo random manner, by systematically iterating through each volume, based on other rules or criteria, and so forth.

A candidate list of volumes is identified (act 206). The first of the two phases in determining whether the target volume is redundant is performed in act 206. The candidate list can include all other volumes (all of the multiple volumes except for the target volume), or a subset of the other volumes. For example, the candidate list can be a list of volumes that at least partially overlap the target volume. In this example, each of the obtained volumes, except for the volume selected as the target volume in act 204, is analyzed to quickly determine with a small amount of computational effort whether the volume at least partially overlaps the target volume. Those of the obtained volumes, except for the volume selected as the target volume in act 204, that at least partially overlap the target volume are included on the candidate list of volumes in act 206.

The target volume is then separated into multiple sub-volumes, and a determination is made as to whether each sub-volume in the candidate list is fully overlapped by one or more source volumes (act 208). The second of the two phases in determining whether the target volume is redundant is performed in act 208. Each volume is made up of multiple voxels. For each source volume, the separation and determination in act 208 can be performed recursively. For each sub-volume that is fully overlapped by the source volume, a record is updated to indicate that all of the voxels in the sub-volume are overlapped. For each sub-volume that is not overlapped by the source volume, the sub-volume need not be further analyzed for the source volume (additionally or alternatively, the record can be updated to reflect that all of the voxels in the sub-volume are not overlapped by the source volume). In one or more embodiments, for each sub-volume that is partially overlapped by the source volume, the sub-volume is further separated into multiple sub-volumes and a determination made as to whether each of those sub-volumes is fully overlapped by the source volume. This separation and determination continues until one of three different conditions are satisfied. The first condition is that a sub-volume is fully overlapped by the source volume, the second condition is that a sub-volume is not overlapped by the source volume, and the third condition is that a sub-volume can no longer be sub-divided (e.g., the sub-volume includes a single voxel).

A check is then made as to whether the target volume is fully overlapped by one or more source volumes (act 210). Different parts of the target volume may be overlapped by different source volumes, or all of the target volume may be overlapped by a single source volume. The target volume is determined to be fully overlapped in act 210 in response to all of the voxels in all of the sub-volumes of the target volume being overlapped. If the target volume is fully overlapped by the one or more source volumes, then the target volume is excluded from further processing (act 212). This exclusion of the target volume from further processing can take various forms. In one or more embodiments, this exclusion refers to excluding the target volume from a volume list for the environment, the volume list for the environment being a list of all volumes in the environment (e.g., a list of all of the volumes obtained in act 202), except for the target volumes that are fully overlapped by one or more source volumes. Additionally or alternatively, this exclusion refers to integrating any data included in the target volume into the one or more source volumes that overlap the target volume. However, if the target volume is not fully overlapped by the one or more source volumes, then the target volume is added to the volume list for the environment (act 214).

Figure 3:
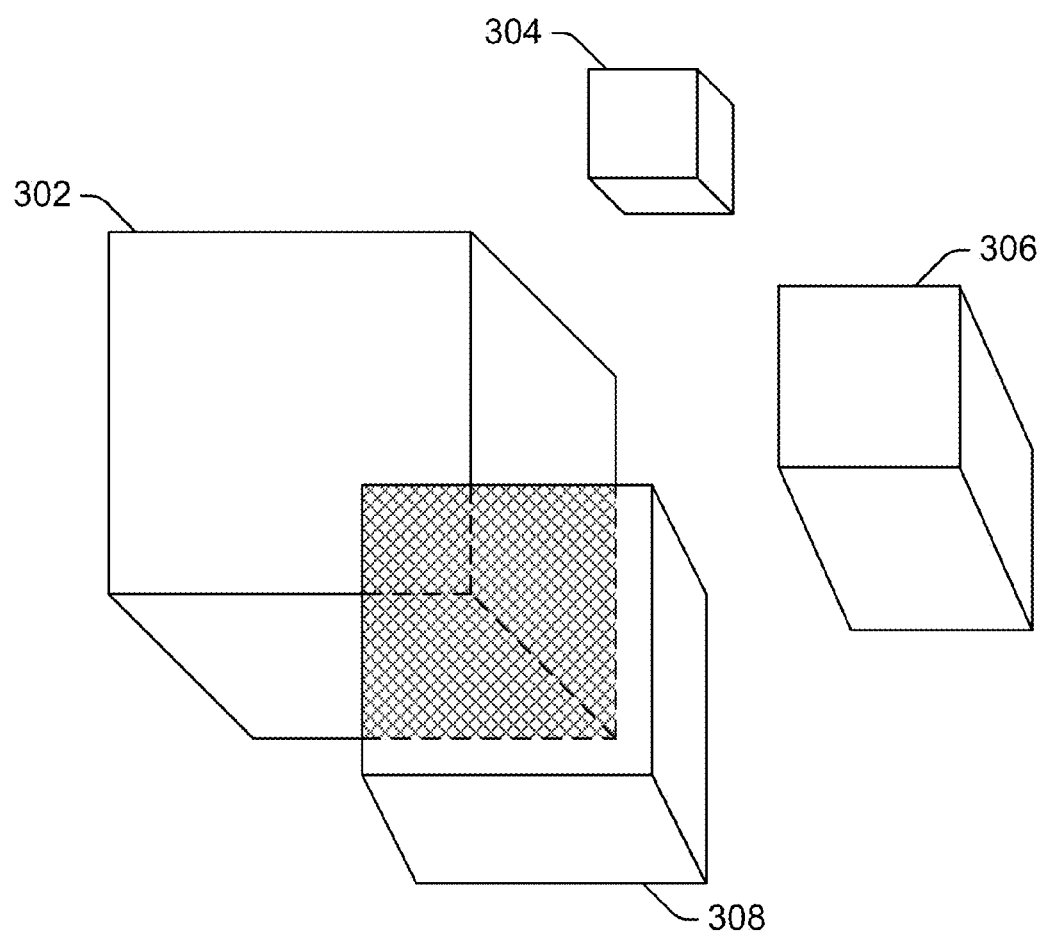
FIG. 3 illustrates an example of volumes that are not fully overlapped in accordance with one or more embodiments.

FIG. 3 illustrates an example of volumes that are not fully overlapped in accordance with one or more embodiments. FIG. 3 illustrates an example environment 300 that includes four volumes 302, 304, 306, and 308. An environment typically includes more than four volumes, but only four volumes are illustrated in FIG. 3 for ease of explanation. The volumes 302, 304, 306, and 308 are 3D volumes, and the volume 308 partially overlaps the volume 302, shown by the cross-hatched area 310. The portion of the edge of the volume 302 that is overlapped by the volume 308 is illustrated with a dashed line. The volume 304 is not overlapped by, and does not overlap, any of the volumes 302, 306, and 308. Similarly, the volume 306 is not overlapped by, and does not overlap, any of the volumes 302, 304, or 308.

Figure 4:
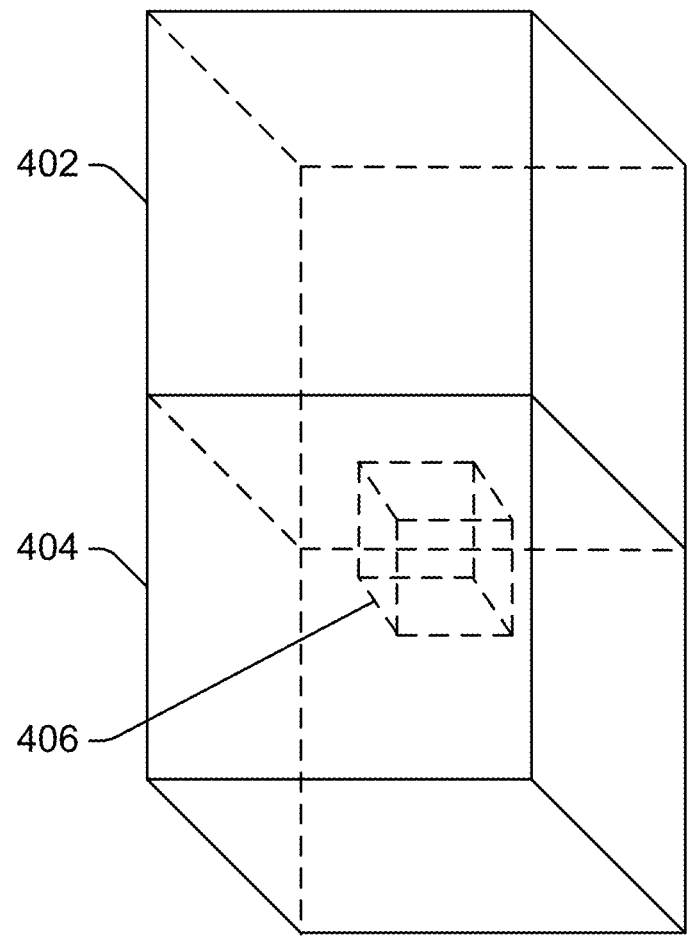
FIG. 4 illustrates an example of a volume that is fully overlapped in accordance with one or more embodiments.

FIG. 4 illustrates an example of a volume that is fully overlapped in accordance with one or more embodiments. FIG. 4 illustrates an example environment 400 that includes three volumes 402, 404, and 406. An environment typically includes more than three volumes, but only three volumes are illustrated in FIG. 4 for ease of explanation. The volumes 402, 404, and 406 are 3D volumes, and each of the volumes 402 and 404 partially overlaps the volume 406, and together the volumes 402 and 404 fully overlap the volume 406. The edges of the volume 406, which are overlapped by the volumes 402 and 404, are illustrated with a dashed line.

Returning to FIG. 2, regardless of whether the target volume is excluded from further processing, the process 200 continues to check whether there are additional volumes to select as the target volume (act 216). If there are additional volumes in the multiple volumes obtained in act 202 that have not yet been selected in act 204, the process 200 returns to act 204 to select one of those volumes. In one or more embodiments, acts 204-210 are repeated for each of the obtained multiple volumes, so each of the multiple volumes obtained in act 202 is analyzed as a target volume to determine whether the volume is fully overlapped by one or more other volumes.

If there are no additional volumes in the multiple volumes obtained in act 202 that have not yet been selected in act 204, the volume list is optionally provided to a display generation system (act 218). In one or more embodiments, the display generation system then processes the volumes in the volume list and generates a display of the environment using the volume list. Thus, volumes in the environment that are fully overlapped by other volumes in the environment are excluded from the volume list, and are not used in generating the display. Additionally or alternatively, various other operations on the volumes in the volume list can be performed. For example, simulations on the environment that includes the volumes can be performed, or other processing of the volumes can be performed.

In one or more embodiments, the first phase in act 206 is performed followed by the second phase in act 208. Alternatively, the first phase may be partially completed (e.g., a particular number of (but typically less than all of) the source volumes that at least partially overlap the target volume are identified) can be identified in act 208, and those source volumes placed on the candidate list for analysis in the second phase in act 208. If the target volume is fully overlapped by one or more of those source volumes, then process 206 need not continue. However, if the target volume is not fully overlapped by one or more of those source volumes, then process 200 returns to act 206 to identify additional source volumes that at least partially overlap the target volume.

Alternatively, acts 206 and 208 can be performed concurrently. Each time a source volume that at least partially overlaps the target volume is identified in act 206, a determination is made in act 208 as to whether each sub-volume is overlapped by one or more source volumes (the source volumes that have been identified thus far in act 206). The check in act 210 can be repeatedly made, so that as soon as a target volume is determined to be fully overlapped by one or more source volumes, the process 200 can proceed to act 212 rather than identifying any additional source volumes that may overlap the target volume.

Figure 5:
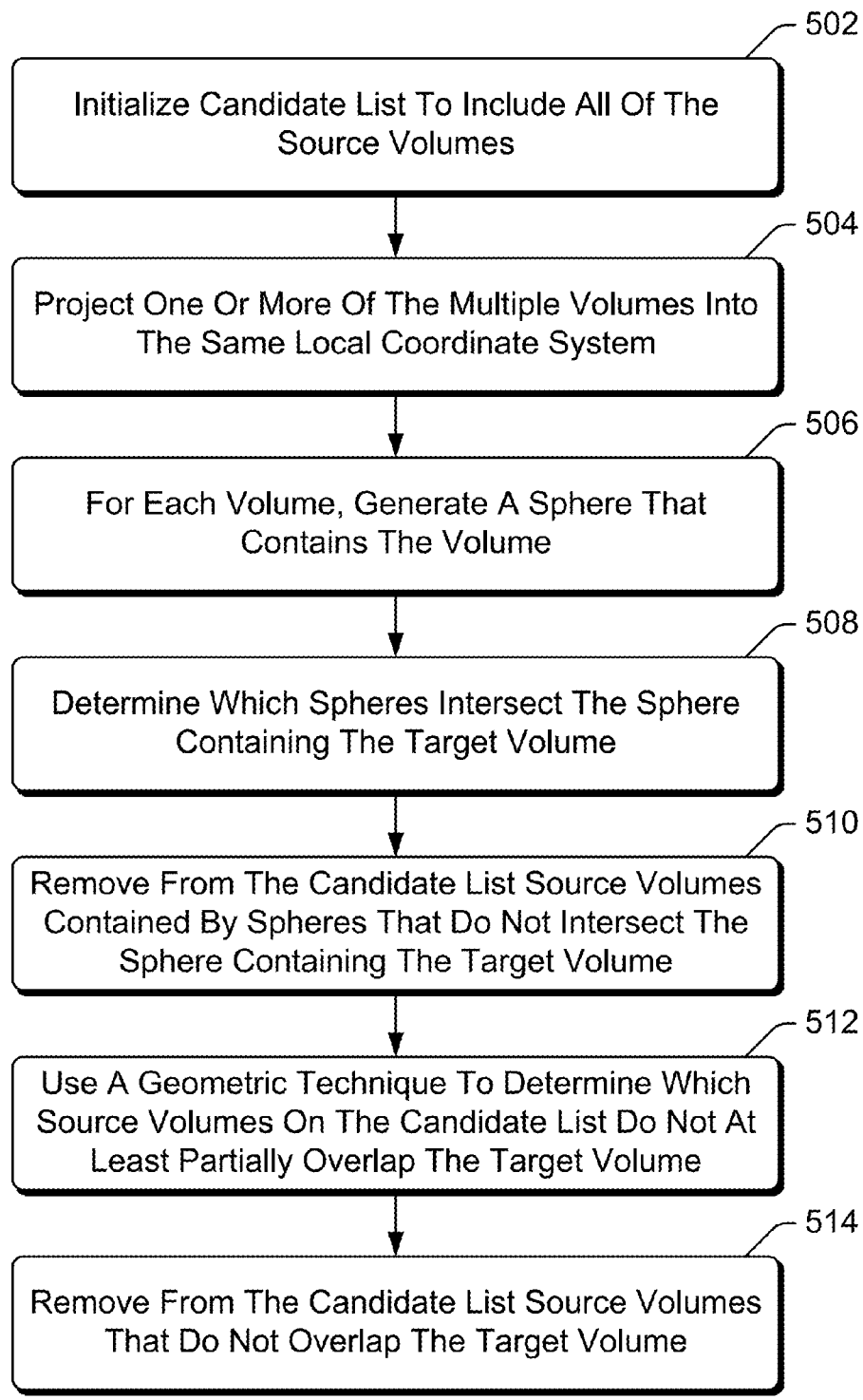
FIG. 5 is a flowchart illustrating an example process for identifying a candidate list of volumes that at least partially overlap a target volume in accordance with one or more embodiments.

FIG. 5 is a flowchart illustrating an example process 500 for identifying a candidate list of volumes that at least partially overlap a target volume in accordance with one or more embodiments. Process 500 is carried out by one or more devices implementing a broad phase analysis module, such as broad phase analysis module 106 of FIG. 1, and can be implemented in software, firmware, hardware, or combinations thereof. In one or more embodiments, the process 500 implements act 206 of FIG. 2, the first of the two phases in determining whether the target volume is redundant. Process 500 is shown as a set of acts and is not limited to the order shown for performing the operations of the various acts. Process 500 is an example process for identifying a candidate list of volumes that at least partially overlap a target volume; additional discussions of identifying a candidate list of volumes that at least partially overlap a target volume are included herein with reference to different figures.

In process 500, the candidate list is initialized to include all of the source volumes in the volume record (act 502). In one or more embodiments, the candidate list is initialized to include all of the obtained volumes in the environment (e.g., as obtained in act 202 of FIG. 2) except for the target volume (e.g., as selected in act 204 of FIG. 2).

One or more of the multiple volumes are projected into the same local coordinate system (act 504). In one or more embodiments, each of the source volumes on the candidate list is projected into the same local coordinate system as the target volume. Alternatively, the target volume can be projected into each of the local coordinate systems of the source volumes, or the target volume as well as the source volumes can be projected into some other local coordinate system. Although the volumes have different local coordinate systems as discussed above, the relationship between the different local coordinate systems is known. Given this relationship, one volume can be projected into the local coordinate system of another volume using any of a variety of public and/or proprietary techniques.

For each of the volumes, a sphere is generated that contains the volume (act 506). A sphere is generated for each of the source volumes as well as the target volume. A sphere that contains a volume refers to a sphere that includes (on the surface of the sphere or within the sphere) all of the voxels of the volume. In one or more embodiments, each volume is rectangular prism and a sphere is generated for a volume by creating a sphere having a center at the center of the rectangular prism and having a diameter equal to the longest diagonal of the rectangular prism (a diagonal referring to a line running between two corners of the rectangular prism and passing through the center of the rectangular prism).

A determination is made as to which of these spheres intersect the sphere containing the target volume (act 508). Whether two spheres intersect can be determined using any of a variety of public and/or proprietary techniques, and this determination is performed quickly. This determination being performed quickly refers to the determination being performed within a threshold amount of time, or faster than the geometric technique discussed in act 512 below can be performed as well as faster than the recursive separation and determination in act 208 of FIG. 2 can be performed.

If a sphere that contains a source volume intersects the sphere that contains the target volume, then that source volume may overlap the target volume. However, if the sphere that contains the source volume does not intersect the sphere that contains the target volume, then that source volume does not overlap the target volume. Accordingly, source volumes that are contained in spheres that do not intersect the sphere that contains the target volume are removed from the candidate list (act 510). The use of sphere intersection in acts 506 and 508 provides a quick identification of source volumes that do not overlap the target volume, and this determination is performed faster than the geometric technique discussed in act 512 below can be performed as well as faster than the recursive separation and determination in act 208 of FIG. 2 can be performed. These source volumes can thus be removed from consideration as possibly overlapping the target volume with a small amount of time and processor effort being expended in making the determination.

A geometric technique is then used to determine which source volumes on the candidate list do not overlap the target volume (act 512). The geometric technique refers to a technique in which the target volume and a source volume are compared to one another geometrically to determine whether the source volume at least partially overlaps the target volume. The geometric technique need not, and typically does not, provide an indication of how the source volume overlaps the target volume or how much of the target volume is overlapped by the source volume, but simply whether the source volume at least partially overlaps the target volume. Any of a variety of different public and/or proprietary geometric techniques can be used to determine which source volumes on the candidate list do not overlap the target volume. In one or more embodiments, the geometric technique used is the well-known separating axis theorem, although other techniques can alternatively be used.

Source volumes that do not at least partially overlap the target volume are removed from the candidate list (act 514). The identification of source volumes that do not overlap the target volume can be performed using the geometric technique in act 512 more quickly than can be performed using the recursive separation and determination in act 208 of FIG. 2 can be performed. These source volumes can thus be removed from consideration as overlapping the target volume with less time and processor effort being expended in making the determination than would be expended if acts 512 and 514 were not performed.

Acts 502-510 are discussed with reference to initializing a candidate list to include all of the source volumes, and then removing from the candidate list those source volumes contained by spheres that do not intersect the sphere containing the target volume. Alternatively, the reverse can be done—the candidate list can be initialized to include no source volumes, and source volumes that are contained by spheres that do intersect the sphere containing the target volume are added to the candidate list.

Process 500 describes using two example techniques to identify source volumes that do not overlap a target volume. Alternatively, only one of these two techniques may be performed. For example, the sphere-based technique discussed in acts 506-510 may be performed but the geometric technique discussed in act 512 may not be performed. By way of another example, the geometric technique discussed in act 512 may be performed but the sphere-based technique discussed in acts 506-510 may not be performed. It should also be noted that other techniques to identify candidate volumes can be performed as discussed above with reference to act 206 of FIG. 2.

Figure 6:
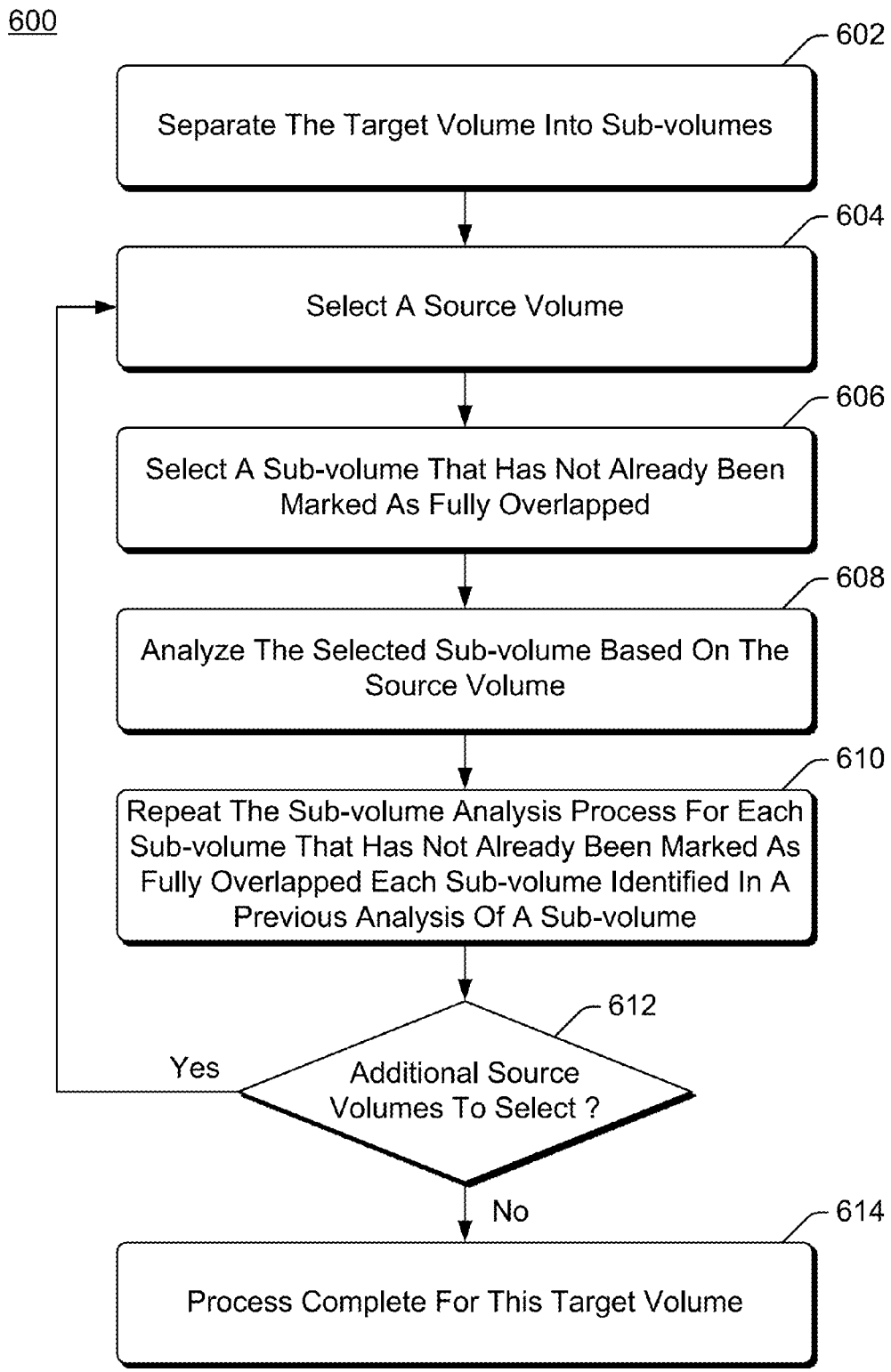
FIG. 6 is a flowchart illustrating an example process for recursively separating the target volume into multiple sub-volumes and determining whether sub-volumes are overlapped in accordance with one or more embodiments.

FIG. 6 is a flowchart illustrating an example process 600 for recursively separating the target volume into multiple sub-volumes and determining whether sub-volumes are overlapped in accordance with one or more embodiments. Process 600 is carried out by one or more devices implementing a narrow phase analysis module, such as narrow phase analysis module 108 of FIG. 1, and can be implemented in software, firmware, hardware, or combinations thereof. In one or more embodiments, the process 600 implements act 208 of FIG. 2, the second of the two phases in determining whether the target volume is redundant. Process 600 is shown as a set of acts and is not limited to the order shown for performing the operations of the various acts. Process 600 is an example process for recursively separating the target volume into multiple sub-volumes and determining whether sub-volumes are overlapped; additional discussions of recursively separating the target volume into multiple sub-volumes and determining whether sub-volumes are overlapped are included herein with reference to different figures.

In process 600, the target volume is separated or subdivided into multiple sub-volumes (act 602). Each of the sub-volumes typically includes multiple voxels, although in some situations sub-volumes may include only a single voxel. In one or more embodiments, the target volume is separated into eight different sub-volumes, also referred to as octants Alternatively, the target volume can be separated into different numbers of sub-volumes.

Figure 7:
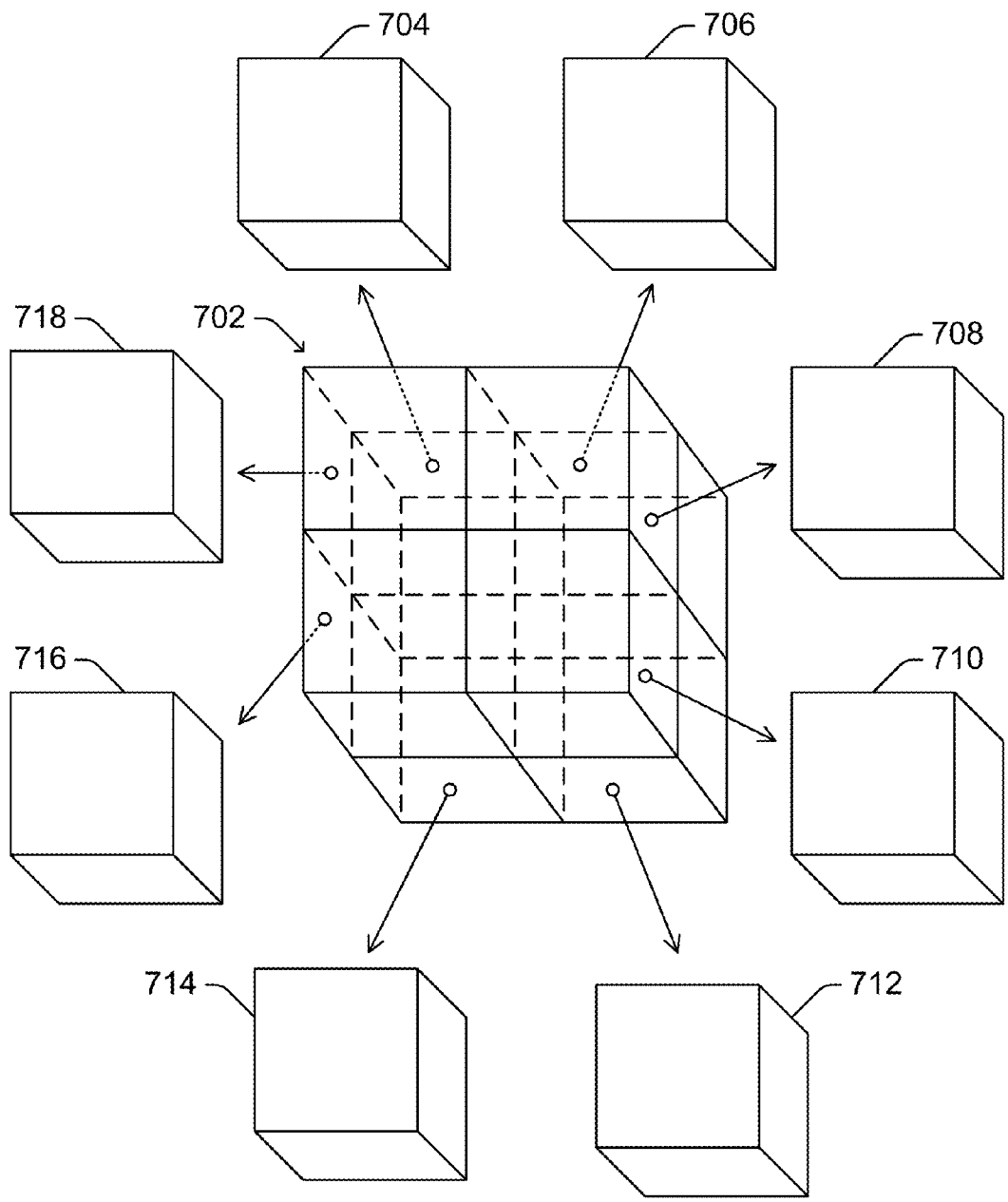
FIG. 7 illustrates an example of separating a target volume into multiple sub-volumes in accordance with one or more embodiments.

In one or more embodiments, in act 602 the target volume is separated into multiple equally sized sub-volumes. FIG. 7 illustrates an example of separating a target volume into multiple sub-volumes in accordance with one or more embodiments. A target volume 702 is illustrated as a rectangular prism that is separated into each of eight different equally sized sub-volumes 704, 706, 708, 710, 712, 714, 716 and 718. Determination of whether the target volume 702 is overlapped by a source volume is made based on these sub-volumes 704, 706, 708, 710, 712, 714, 716 and 718, as discussed in more detail below.

Returning to FIG. 6, a source volume is selected (act 604). The source volume is one of the volumes in the candidate list of volumes (e.g., as identified in act 206 of FIG. 2). The source volume can be selected in any of a variety of manners, such as based on a size of (a number of voxels included in) the source volume (e.g., the source volume with the most or least voxels is selected), in a random or pseudo random manner, based on other rules or criteria, and so forth. One or both of the target volume and the selected source volume can optionally be projected into the same local coordinate system. However, if this projection was previously performed in the first phase (e.g., in act 504), then the projection typically need not be performed again in process 600.

A sub-volume that has not already been marked as fully overlapped is selected (act 606). The first time act 606 is performed for a particular target volume, none of the sub-volumes will have been marked as fully overlapped. However, as various additional source volumes are selected, some of the sub-volumes may become marked as fully overlapped. The markings of which sub-volumes have been determined to be fully overlapped can be maintained in a variety of different manners.

In one or more embodiments, the target volume is represented by a tree structure having a top node representing the target volume and bottom (leaf) nodes representing voxels. Multiple different layers of nodes can be situated between the top node and the leaf nodes, each such layer representing sub-volumes of the target volume.

Figure 8:
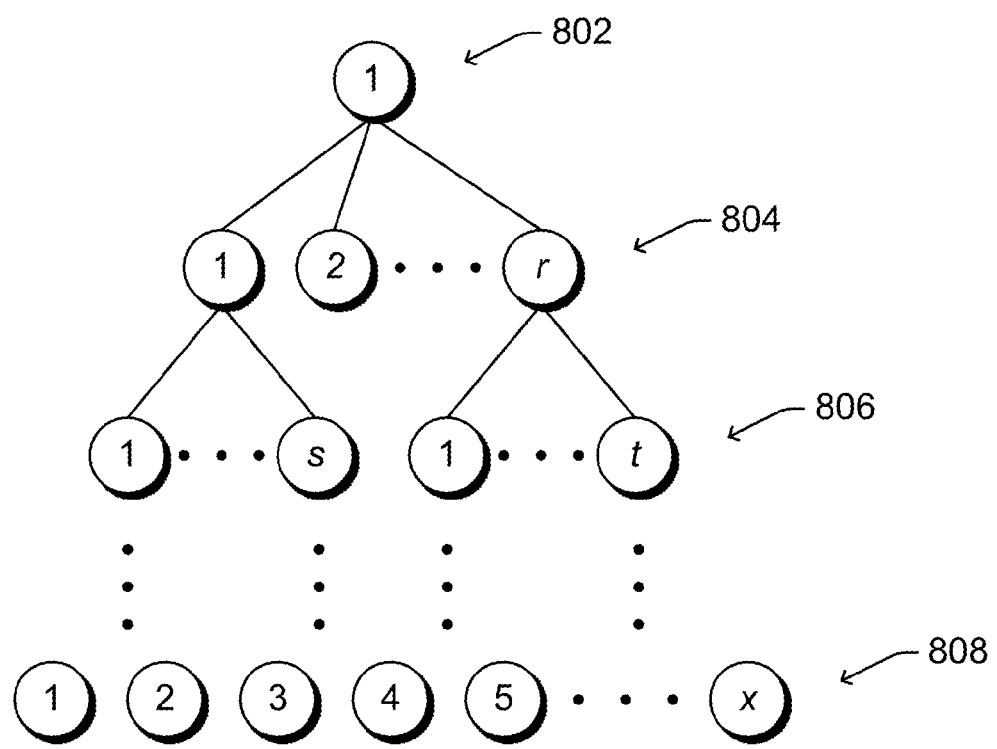
FIG. 8 illustrates an example tree structure representing a target volume in accordance with one or more embodiments.

FIG. 8 illustrates an example tree structure 800 representing a target volume in accordance with one or more embodiments. The tree structure 800 includes a top layer 802 with a single node corresponding to the entire target volume. The node at the top layer 802 has multiple (r) children nodes at the next lower layer 804, each corresponding to a sub-volume of the target volume. In situations in which the target volume is separated into eight sub-volumes, the layer 804 includes eight children nodes. Each node of the layer 804 can be separated into multiple sub-volumes, and in the next lower layer 806 each node in the layer 804 has multiple children nodes. For example, the node 1 in layer 804 is illustrated as having multiple (s) children nodes, such as one node corresponding to each of eight sub-volumes of the node 1 in layer 804. By way of further example, the node r in layer 804 is illustrated as having multiple (t) children nodes, such as one node corresponding to each of eight sub-volumes of the node r in layer 804. Multiple additional lower layers can also be include in the tree structure 800, down to a lowest layer 808 where the nodes (also referred to as leaf nodes in the lowest layer) each correspond to a single voxel in the target volume.

In one or more embodiments, the tree structure 800 is used to maintain the markings of which sub-volumes have been determined to be fully overlapped by one or more source volumes. The markings can be maintained, for example, with a single bit value or a flag value associated with each node that can be set (e.g., assigned a value of one) to indicate that the sub-volume has been determined to be fully overlapped by at least one source volume, and cleared (e.g., assigned a value of zero) to indicate that the sub-volume has not has been determined to be fully overlapped by at least one source volume. By way of example, a bit value associated with node 1 of layer 804 can be set to indicate that the sub-volume corresponding to node 1 of layer 804 has been determined to be fully overlapped by at least one source volume. Given this marking, it is also known that all children nodes (whether corresponding to a sub-volume or a voxel) of node 1 of layer 804, as well as all children nodes of those nodes and so forth, are also fully overlapped by at least one source volume.

It should be noted that the tree structure 800 is an example of a data structure that can be used to maintain the markings of which sub-volumes have been determined to be fully overlapped by one or more source volumes. Various other data structures can also be used, such as tables, lists, and so forth.

Returning to FIG. 6, the sub-volume is analyzed based on the source volume (act 608). The sub-volume is the sub-volume selected in act 606, and the source volume is the source volume selected in act 604. Analyzing the sub-volume based on the source volume refers to determining how much of the sub-volume is overlapped by the source volume, and proceeding to further evaluate or not further evaluate the sub-volume based on that determination.

Figure 9:
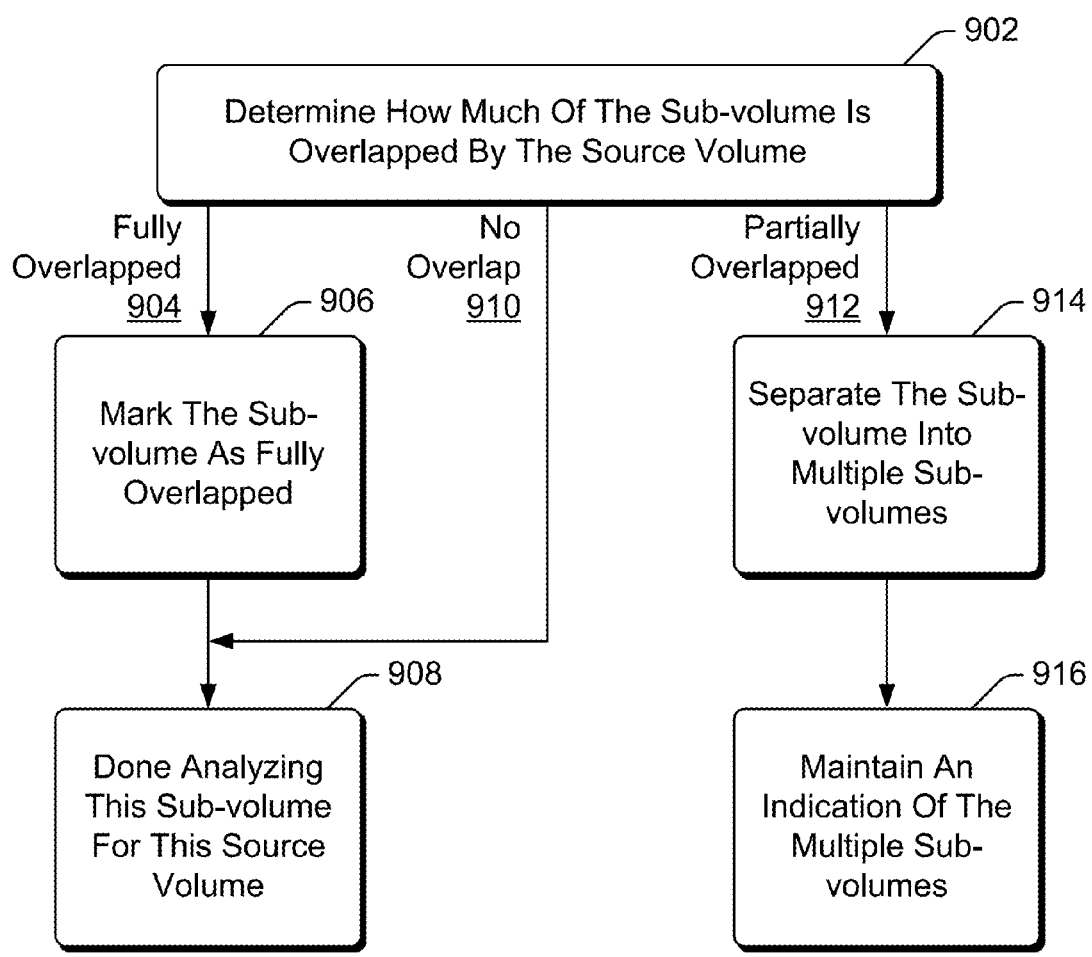
FIG. 9 is a flowchart illustrating an example process for analyzing a sub-volume based on a source volume in accordance with one or more embodiments.

FIG. 9 is a flowchart illustrating an example process 900 for analyzing a sub-volume based on a source volume in accordance with one or more embodiments. Process 900 is carried out by one or more devices implementing a narrow phase analysis module, such as narrow phase analysis module 108 of FIG. 1, and can be implemented in software, firmware, hardware, or combinations thereof. In one or more embodiments, the process 900 implements act 608 of FIG. 6. Process 900 is shown as a set of acts and is not limited to the order shown for performing the operations of the various acts. Process 900 is an example process for analyzing a sub-volume based on a source volume; additional discussions of analyzing a sub-volume based on a source volume are included herein with reference to different figures.

In process 900, a determination is made as to how much of the sub-volume is overlapped by the source volume (act 902). The determination of "how much" in act 902 refers to a determination of one of the following: 1) that the sub-volume is fully overlapped by the source volume, 2) that the sub-volume is not at all overlapped by the source volume, or 3) that the sub-volume is partially overlapped by the source volume.

In one or more embodiments, act 902 is implemented as a two-part process. First, a determination is made using a geometric technique (e.g., the same technique used in act 512 of FIG. 5, such as the separating axis theorem) to determine whether the sub-volume is at least partially overlapped by the source volume. If the geometric technique indicates that the sub-volume is not at least partially overlapped by the source volume, then the second part of the determination need not be made. However, if the geometric technique indicates that the sub-volume is at least partially overlapped by the source volume, then the second part of the determination is made.

Figure 10:
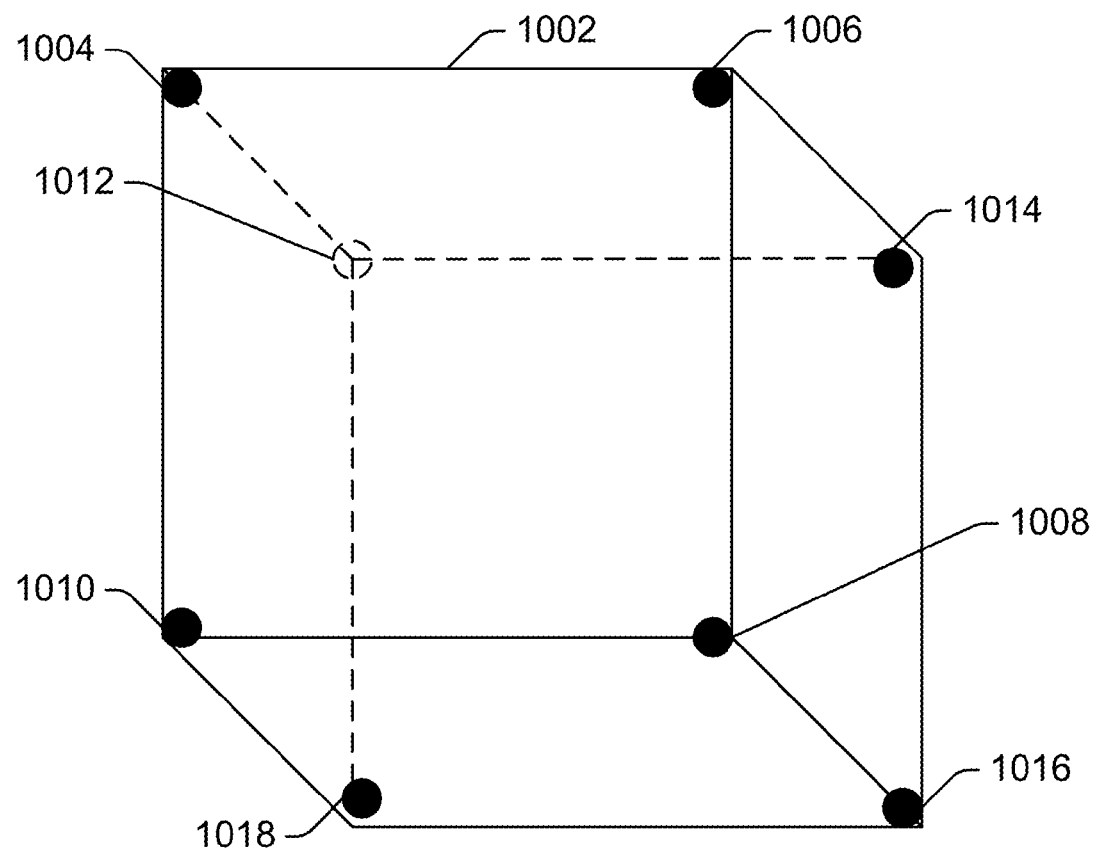
FIG. 10 illustrates an example sub-volume in accordance with one or more embodiments.

In the second part of the determination, a check is made as to whether the voxels in each of the corners (e.g., each of the eight corners in the case of a sub-volume that is a rectangular prism) is included in the source volume (or, if the sub-volume includes a single voxel, whether the single voxels is included in the source volume). FIG. 10 illustrates an example sub-volume 1002 in accordance with one or more embodiments. The sub-volume 1002 is a rectangular prism, and includes eight voxels 1004, 1006, 1008, 1010, 1012, 1014, 1016, and 1018, shown as circles. One voxel in each corner of the sub-volume 1002 is shown, although the sub-volume 1002 can include many more voxels, those have not been shown in order to avoid cluttering the drawing. If the voxels in all of the corners of the sub-volume are included in the source volume, then the sub-volume is fully overlapped by the source volume. However, if at least one voxel of the sub-volume (a voxel in the corner of the sub-volume or elsewhere in the sub-volume) is not included in the source volume, then the sub-volume is partially overlapped by the source volume.

Returning to FIG. 9, rather than implementing act 902 as a two-part process, the first part can be skipped and only the second part performed.

Regardless of the manner in which act 902 is implemented, the determination made in act 902 is one of the following: 1) that the sub-volume is fully overlapped by the source volume, 2) that the sub-volume is not at all overlapped by the source volume, or 3) that the sub-volume is partially overlapped by the source volume. The sub-volume is fully overlapped by the source volume if all of the voxels in the sub-volume are included in the source volume (if all of the voxels in the corners of the sub-volume are included in the source volume then, due to the nature of the shape of the 3D sub-volume, all of the voxels in the sub-volume are included in the source volume). The sub-volume is not at all overlapped by the source volume if none of the voxels in the sub-volume are included in the source volume. The sub-volume is partially overlapped by the source volume if at least one, but less than all, of the voxels in the sub-volume are included in the source volume.

In response to a determination that the sub-volume is fully overlapped 904, the sub-volume is marked as fully overlapped (act 906). This marking can be done in different manners as discussed above, such as setting a bit value or flag of a node corresponding to the sub-volume in a data structure. Analysis of the sub-volume for this source volume is then done (act 908). Because the sub-volume is fully overlapped, further sub-volumes of that sub-volume need not be analyzed because it is already known they are fully overlapped by the sub-volume.

It should be noted that no indication of which source volume overlaps the sub-volume need be maintained in act 906. The techniques discussed herein are concerned with determining whether a given volume is overlapped, not which other volumes overlap the given volume. It should also be noted that a particular source volume that fully overlaps a given sub-volume may later itself be determined to be fully overlapped by one or more other source volumes, and may itself be excluded from the volume list provided to the display generation system. This situation does not, however, alter the fact that the given sub-volume is overlapped because whatever other source volumes overlap the particular source volume would also overlap the given sub-volume. This situation assumes that the given sub-volume is not being considered as overlapping the particular source volume—e.g., if two volumes cover exactly the same space then only one (not both) should be excluded from the volume list.

In response to a determination that the sub-volume is not overlapped 910, analysis of the sub-volume for this source volume is done (act 908). Because the sub-volume is not overlapped at all by the source volume, further sub-volumes of that sub-volume need not be analyzed because it is already known they are not overlapped by sub-volume.

In response to a determination that the sub-volume is partially overlapped 912, the sub-volume itself is separated into multiple sub-volumes (act 914). This separation is performed analogous to the separation of the target volume into multiple sub-volumes in act 602 of FIG. 6. An indication of the multiple sub-volumes generated in act 914 is maintained (act 916), allowing those sub-volumes to be further analyzed as discussed in more detail below.

Returning to FIG. 6, the analysis of a selected sub-volume in act 608 is repeated (act 610). This analysis is repeated for each sub-volume generated in act 606 that has not already been marked as fully overlapped, and for each source volume identified in a previous analysis of a sub-volume (i.e., for each sub-volume generated in act 914 of FIG. 9). In one or more embodiments, each sub-volume generated in act 602 that has not already been marked as fully overlapped is analyzed in act 608, and each sub-volume that is analyzed and determined to be partially overlapped by the source volume is separated into additional sub-volumes which themselves are analyzed. The separation and analysis of sub-volumes is thus done recursively, until the separation results in sub-volumes that include a single voxel.

Alternatively, rather than performing the separation and analysis of sub-volumes recursively, the sub-volumes can be generated in different manners. For example, the target volume can be split along a preset uniform grid (e.g., in act 602 above) to generate the sub-volumes. By way of another example, the separation of the target volume into multiple sub-volumes in act 602 can be performed by having each voxel in the target volume be its own sub-volume.

A check is then made as to whether there are additional source volumes to select (act 612). If there are source volumes in the candidate list that have not yet been selected in act 604, the process 600 returns to act 604 to select one of those source volumes. If all of the source volumes in the candidate list have already been selected in act 604, then the process 600 is complete for the current target volume (act 614). The process 600 is repeated, however, for additional target volumes.

After process 600 is completed, a check is made as to whether the target volume is fully overlapped by one or more source volumes, as discussed above in act 210 of FIG. 2. This check can be performed in a variety of different manners. In one or more embodiments, the check is performed by analyzing the tree structure to determine whether each sub-volume in the tree structure is marked as being fully overlapped. During the analysis, if all sub-volumes of a particular sub-volume are marked as being fully overlapped, than that particular sub-volume is also marked as being fully overlapped. For example, referring to FIG. 8, if the children nodes of node 1 of layer 804 (i.e., nodes 1 through s of layer 806 that are children of node 1 of layer 804) are all marked as being fully overlapped, then node 1 of layer 804 is marked as being fully overlapped during this analysis. If all sub-volumes in the tree structure are marked as being fully overlapped, then the target volume is fully overlapped by one or more source volumes. If all sub-volumes in the tree structure are not marked as being fully overlapped, then the target volume is not fully overlapped by one or more source volumes.

Alternatively, the check can be performed in other manners. In one or more embodiments, the check is performed by maintaining a count of voxels while analyzing the sub-volumes in process 900. Each time a sub-volume is marked as being fully overlapped in act 906, the voxel count is incremented by the number of voxels included in that sub-volume. For example, if the sub-volume includes only a single voxel then the voxel count is incremented by one, but if the sub-volume includes 128 voxels, then the voxel count is incremented by 128. The voxel count is then compared to the quantity of voxels included in the target volume. If the voxel count equals the quantity of voxels included in the target volume, then the target volume is fully overlapped by one or more source volumes.

This comparison of the voxel count to the quantity of voxels included in the target volume can be performed after process 600 is completed for the target volume, or alternatively can be performed during process 600 for the target volume. For example, after checking whether there are additional source volumes to select in act 612, a check can be made as to whether the voxel count equals the quantity of voxels included in the target volume. If the voxel count does not equal the quantity of voxels included in the target volume, then source volumes have not yet been selected that fully overlap the target volume, and the process 600 returns to act 604 as discussed above (or act 614 if there are no more source volumes to select). However, if the voxel count does equal the quantity of voxels included in the target volume, then source volumes that fully overlap the target volume have been selected, and the process 600 proceeds to act 614—the process is 600 is complete for this target volume because there is no need to evaluate further source volumes due to the target volume being fully overlapped by the source volumes already selected.

Returning to FIG. 1, the volume list 110 excludes the volumes determined to be fully overlapped by one or more other volumes as discussed above. In certain situations, additional voxels in the environment can also be treated as being overlapped, such as voxels that have not been observed. A voxel that has not been observed refers to a voxel that is included in a volume of the volume record 102, but the voxel is included in a region of the environment that has not yet been measured by a device or system that is in the process of measuring the environment. As the region that includes the voxel has not been measured, the voxel that is included in that region (the voxel that has not been observed) can be treated as overlapped.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 11:
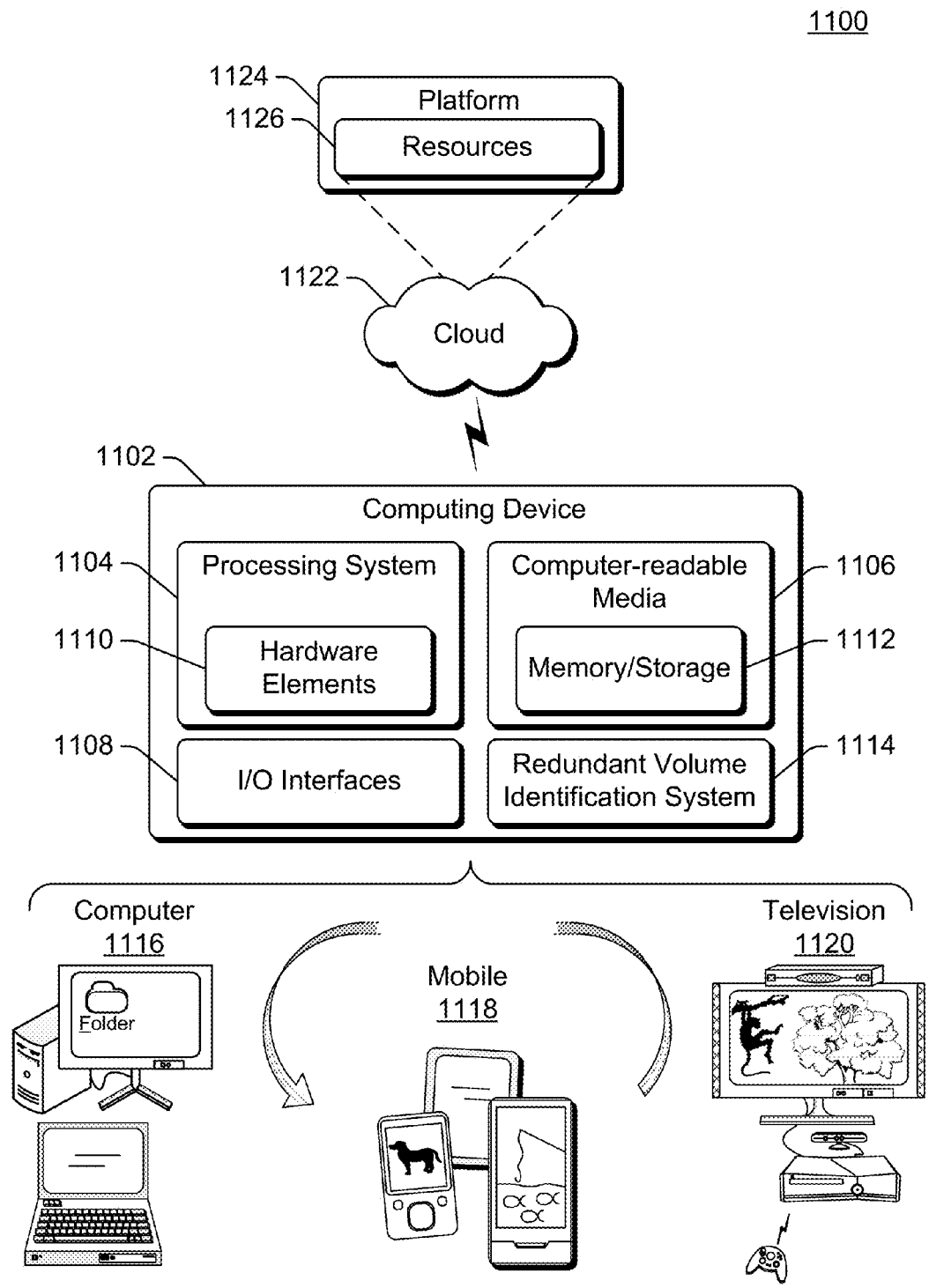
FIG. 11 illustrates an example system that includes an example computing device that is representative of one or more systems and/or devices that may implement the various techniques described herein.

FIG. 11 illustrates an example system generally at 1100 that includes an example computing device 1102 that is representative of one or more systems and/or devices that may implement the various techniques described herein. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O Interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1106 is illustrated as including memory/storage 1112. The memory/storage 1112 represents memory/storage capacity associated with one or more computer-readable media. The memory/storage 1112 may include volatile media (such as random access memory (RAM)) and/or nonvolatile media (such as read only memory (ROM), Flash memory, optical disks, magnetic disks, and so forth). The memory/storage 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

The one or more input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1102 may be configured in a variety of ways as further described below to support user interaction.

The computing device 1102 also includes a redundant volume identification system 1114. The redundant volume identification system 1114 implements a two-phase approach to determine whether a target volume is redundant as discussed above. The redundant volume identification system 1114 can implement, for example, the redundant volume identification system 104 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1110 and computer-readable media 1106 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of modules as a module that is executable by the computing device 1102 as software may be achieved at least partially in hardware, e.g., through use of computer-readable storage media and/or hardware elements 1110 of the processing system. The instructions and/or functions may be executable/operable by one or more articles of manufacture (for example, one or more computing devices 1102 and/or processing systems 1104) to implement techniques, modules, and examples described herein.

As further illustrated in FIG. 11, the example system 1100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1100, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1102 may assume a variety of different configurations, such as for computer 1116, mobile 1118, and television 1120 uses. Each of these configurations includes devices that may have generally different constructs and capabilities, and thus the computing device 1102 may be configured according to one or more of the different device classes. For instance, the computing device 1102 may be implemented as the computer 1116 class of a device that includes a personal computer, desktop computer, a multi-screen computer, laptop computer, netbook, and so on.

The computing device 1102 may also be implemented as the mobile 1118 class of device that includes mobile devices, such as a mobile phone, portable music player, portable gaming device, a tablet computer, a multi-screen computer, and so on. The computing device 1102 may also be implemented as the television 1120 class of device that includes devices having or connected to generally larger screens in casual viewing environments. These devices include televisions, set-top boxes, gaming consoles, and so on.

The techniques described herein may be supported by these various configurations of the computing device 1102 and are not limited to the specific examples of the techniques described herein. This functionality may also be implemented all or in part through use of a distributed system, such as over a "cloud" 1122 via a platform 1124 as described below.

The cloud 1122 includes and/or is representative of a platform 1124 for resources 1126. The platform 1124 abstracts underlying functionality of hardware (e.g., servers) and software resources of the cloud 1122. The resources 1126 may include applications and/or data that can be utilized while computer processing is executed on servers that are remote from the computing device 1102. Resources 1126 can also include services provided over the Internet and/or through a subscriber network, such as a cellular or Wi-Fi network.

The platform 1124 may abstract resources and functions to connect the computing device 1102 with other computing devices. The platform 1124 may also serve to abstract scaling of resources to provide a corresponding level of scale to encountered demand for the resources 1126 that are implemented via the platform 1124. Accordingly, in an interconnected device embodiment, implementation of functionality described herein may be distributed throughout the system 1100. For example, the functionality may be implemented in part on the computing device 1102 as well as via the platform 1124 that abstracts the functionality of the cloud 1122.

In the discussions herein, various different embodiments are described. It is to be appreciated and understood that each embodiment described herein can be used on its own or in connection with one or more other embodiments described herein. Any of the devices, methods, and so forth discussed herein can be used in conjunction with any other devices, methods, and so forth discussed herein. Further aspects of the techniques discussed herein relate to one or more of the following embodiments.

A method comprising: obtaining multiple volumes in an environment, each volume being a 3D volume described by a 3D grid of multiple voxels; selecting one of the multiple volumes to be a target volume; identifying, in a first phase, a candidate list of multiple source volumes; identifying, in a second phase, which of multiple sub-volumes of the target volume are overlapped by at least one of the source volumes in the candidate list; determining that the target volume is fully overlapped by at least one source volume in response to all of the sub-volumes being overlapped by at least one source volume; and excluding the target volume from further processing in response to the target volume being fully overlapped by at least one source volume, effective to reduce processor load in a computing device due to fewer volumes in the environment to process.

Alternatively or in addition to any of the above described methods, any one or combination of: the identifying which of multiple sub-volumes of the target volume are overlapped by at least one of the source volumes in the candidate list including recursively separating each of one or more of the sub-volumes into multiple sub-volumes until one of three conditions is satisfied, the three conditions including a condition that the sub-volume can no longer be further separated into sub-volumes, a condition that the sub-volume is fully overlapped by at least one source volume, and a condition that the sub-volume is not overlapped by the source volumes; the identifying which of multiple sub-volumes of the target volume are overlapped by at least one of the source volumes in the candidate list including updating a record, in response to a sub-volume being fully overlapped by one of the multiple source volumes, to indicate that all of the voxels included in the sub-volume are overlapped; the identifying in the first phase including: generating a sphere that contains the target volume, generating, for each of the multiple source volumes, a sphere that contains the source volume, and determining whether the spheres that contain the one or more source volumes intersect the sphere containing the target volume, and excluding from further processing each of the multiple source volumes that is contained in a sphere that does not intersect the sphere containing the target volume; the method further comprising: determining, after excluding from further processing each of the one or more source volumes that is contained in a sphere that does not intersect the sphere containing the target volume, which of the multiple source volumes on the candidate list do not at least partially overlap the target volume, and excluding from further processing each of the multiple source volumes that does not at least partially overlap the target volume; the determining which of the multiple source volumes on the candidate list do not at least partially overlap the target volume comprising using a separating access theorem technique to determine which of the multiple source volumes on the candidate list do not at least partially overlap the target volume; the second phase further including marking, in response to determining that a sub-volume is fully overlapped by a source volume, the sub-volume as being fully overlapped; the second phase further including generating a tree structure having a first node in a top layer and multiple additional nodes in each of multiple additional layers, the first node corresponding to the target volume, and each of the multiple additional nodes corresponding to a sub-volume of the target volume, the marking including setting a flag of a node in the tree structure corresponding to the sub-volume to indicate that the sub-volume is fully overlapped, and analyzing the tree structure to determine whether all sub-volumes in target volume are marked as being fully overlapped; the method further comprising: maintaining, during the second phase, a count of voxels that are overlapped by at least one of the multiple source volumes, and determining that all of the sub-volumes are overlapped by at least one of the multiple source volumes in response to the count of voxels being equal to a quantity of voxels in the target volume; the target volume having a different local coordinate system than the multiple source volumes.

A method for determining whether a target volume is overlapped by one or more additional volumes, the method comprising: determining in a first phase, for each of the one or more additional volumes, whether there is an overlap between the target volume and the additional volume, the target volume having a different local coordinate system than the one or more additional volumes; generating a candidate list that includes one or more source volumes, each source volume being one of the one or more additional volumes that at least partially overlaps the target volume; performing a second phase including, for one or more source volumes in the candidate list: separating the target volume into multiple sub-volumes, determining, for each of the multiple sub-volumes, whether the sub-volume is fully overlapped by the source volume based on whether corner voxels of the sub-volume are present in the source volume, recursively performing the separating and determining for each sub-volume that is not fully overlapped by the source volume; determining that the target volume is fully overlapped by the one or more source volumes in response to all of the sub-volumes being overlapped by at least one of the source volumes; and excluding the target volume from the candidate list in response to the target volume being fully overlapped by at least one of the source volumes, effective to reduce processor load in a computing device due to fewer volumes in the environment to process.

Alternatively or in addition to any of the above described methods, any one or combination of: the method further comprising the determining in the first phase including: generating a sphere that contains the target volume, generating, for each of the one or more source volumes, a sphere that contains the additional volume, and determining whether the spheres that contain the one or more additional volumes intersect the sphere containing the target volume, and the generating including removing from the candidate list each of the one or more source volumes that is contained in a sphere that does not intersect the sphere containing the target volume; the method further comprising using, after removing from the candidate list each of the one or more source volumes that is contained in a sphere that does not intersect the sphere containing the target volume, a geometric technique to determine which of the one or more source volumes on the candidate list do not at least partially overlap the target volume, and removing from the candidate list each of the one or more source volumes that does not at least partially overlap the target volume.

A computing device comprising: one or more processors; and a computer-readable storage medium having stored thereon multiple instructions that, responsive to execution by the one or more processors, cause the one or more processors to perform acts comprising: obtaining multiple volumes in an environment, each volume being a 3D volume described by a 3D grid of multiple voxels; selecting one of the multiple volumes to be a target volume; identifying, in a first phase, a candidate list of multiple source volumes; identifying, in a second phase, which of multiple sub-volumes of the target volume are overlapped by at least one of the source volumes in the candidate list; determining that the target volume is fully overlapped by at least one source volume volumes in response to all of the sub-volumes being overlapped by at least one source volume; and excluding the target volume from further processing in response to the target volume being fully overlapped by at least one source volume, effective to reduce processor load in a computing device due to fewer volumes in the environment to process.

Alternatively or in addition to any of the above described computing devices, any one or combination of: the second phase including recursively separating each of one or more of the sub-volumes into multiple sub-volumes until the sub-volume can no longer be further separated into sub-volumes, the sub-volume is fully overlapped by at least one source volume, or the sub-volume is not overlapped by the source volumes; the identifying in the first phase including generating a sphere that contains the target volume, generating, for each of the multiple source volumes, a sphere that contains the source volume, determining whether the spheres that contain the one or more source volumes intersect the sphere containing the target volume, and excluding from further processing each of the multiple source volumes that is contained in a sphere that does not intersect the sphere containing the target volume; the acts further comprising using, after excluding from further processing each of the one or more source volumes that is contained in a sphere that does not intersect the sphere containing the target volume, a geometric technique to determine which of the multiple source volumes on the candidate list do not at least partially overlap the target volume, and excluding from further processing each of the multiple source volumes that does not at least partially overlap the target volume; the geometric technique comprising using a separating axis theorem technique to determine which of the multiple source volumes on the candidate list do not at least partially overlap the target volume; the second phase further including marking, in response to determining that a sub-volume is fully overlapped by a source volume, the sub-volume as being fully overlapped; the second phase further including generating a tree structure having a first node in a top layer and multiple additional nodes in each of multiple additional layers, the first node corresponding to the target volume, and each of the multiple additional nodes corresponding to a sub-volume of the target volume, the marking including setting a flag of a node in the tree structure corresponding to the sub-volume to indicate that the sub-volume is fully overlapped, and analyzing the tree structure to determine whether all sub-volumes in target volume are marked as being fully overlapped; the acts further comprising maintaining, during the second phase, a count of voxels that are overlapped by at least one of the multiple source volumes, and determining that all of the sub-volumes are overlapped by at least one of the multiple source volumes in response to the count of voxels being equal to a quantity of voxels in the target volume; the target volume having a different local coordinate system than the multiple source volumes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a hardware device comprising:
    obtaining, by the hardware device, multiple volumes in an environment, each volume being a 3D volume described by a 3D grid of multiple voxels;
    selecting, by the hardware device, one of the multiple volumes to be a target volume;
    identifying, in a first phase and by the hardware device, a candidate list of multiple source volumes;
    identifying, in a second phase and by the hardware device, which of multiple sub-volumes of the target volume are overlapped by at least one of the source volumes in the candidate list;
    marking, by the hardware device and as a part of the second phase in response to determining that a sub-volume is fully overlapped by a source volume, the sub-volume as being fully overlapped;
    determining, by the hardware device, that the target volume is fully overlapped by at least one source volume in response to all of the sub-volumes being overlapped by at least one source volume; and
    excluding, by the hardware device, the target volume from further processing in response to the target volume being fully overlapped by at least one source volume, the excluding including excluding the target volume from a list of volumes in the environment.

2. The method as recited in claim 1, the identifying which of multiple sub-volumes of the target volume are overlapped by at least one of the source volumes in the candidate list including recursively separating each of one or more of the sub-volumes into multiple sub-volumes until one of three conditions is satisfied, the three conditions including a condition that the sub-volume can no longer be further separated into sub-volumes, a condition that the sub-volume is fully overlapped by at least one source volume, and a condition that the sub-volume is not overlapped by the source volumes.

3. The method as recited in claim 1, the identifying which of multiple sub-volumes of the target volume are overlapped by at least one of the source volumes in the candidate list including updating a record, in response to a sub-volume being fully overlapped by one of the multiple source volumes, to indicate that all of the voxels included in the sub-volume are overlapped.

4. The method as recited in claim 1, the identifying in the first phase including:
    generating a sphere that contains the target volume;
    generating, for each of the multiple source volumes, a sphere that contains the source volume;
    determining whether the spheres that contain the one or more source volumes intersect the sphere containing the target volume; and
    excluding from further processing each of the multiple source volumes that is contained in a sphere that does not intersect the sphere containing the target volume.

5. The method as recited in claim 4, further comprising:
determining, by the hardware device, after excluding from further processing each of the one or more source volumes that is contained in a sphere that does not intersect the sphere containing the target volume, which of the multiple source volumes on the candidate list do not at least partially overlap the target volume; and excluding from further processing each of the multiple source volumes that does not at least partially overlap the target volume.

6. The method as recited in claim 5, the determining which of the multiple source volumes on the candidate list do not at least partially overlap the target volume comprising using a separating access theorem technique to determine which of the multiple source volumes on the candidate list do not at least partially overlap the target volume.

7. The method as recited in claim 1, the second phase further including:
generating a tree structure having a first node in a top layer and multiple additional nodes in each of multiple additional layers, the first node corresponding to the target volume, and each of the multiple additional nodes corresponding to a sub-volume of the target volume;
the marking including setting a flag of a node in the tree structure corresponding to the sub-volume to indicate that the sub-volume is fully overlapped; and
analyzing the tree structure to determine whether all sub-volumes in target volume are marked as being fully overlapped.

8. The method as recited in claim 1, further comprising:
maintaining, during the second phase, a count of voxels that are overlapped by at least one of the multiple source volumes; and
determining that all of the sub-volumes are overlapped by at least one of the multiple source volumes in response to the count of voxels being equal to a quantity of voxels in the target volume.

9. A method performed by a hardware device for determining whether a target volume is overlapped by one or more additional volumes, the method comprising:
determining, by the hardware device, in a first phase, for each of the one or more additional volumes, whether there is an overlap between the target volume and the additional volume, the target volume having a different local coordinate system than the one or more additional volumes;
generating, by the hardware device, a candidate list that includes one or more source volumes, each source volume being one of the one or more additional volumes that at least partially overlaps the target volume;
performing, by the hardware device, a second phase including, for one or more source volumes in the candidate list:
separating the target volume into multiple sub-volumes,
determining, for each of the multiple sub-volumes, whether the sub-volume is fully overlapped by the source volume based on whether corner voxels of the sub-volume are present in the source volume,
recursively performing the separating and determining for each sub-volume that is not fully overlapped by the source volume; and determining that the target volume is fully overlapped by the one or more source volumes in response to all of the sub-volumes being overlapped by at least one of the source volumes.

10. The method as recited in claim 9, further comprising:
the determining in the first phase including:
generating a sphere that contains the target volume;
generating, for each of the one or more source volumes, a sphere that contains the additional volume; and
determining whether the spheres that contain the one or more additional volumes intersect the sphere containing the target volume; and
the generating including removing from the candidate list each of the one or more source volumes that is contained in a sphere that does not intersect the sphere containing the target volume.

11. The method as recited in claim 10, further comprising:
using, after removing from the candidate list each of the one or more source volumes that is contained in a sphere that does not intersect the sphere containing the target volume, a geometric technique to determine which of the one or more source volumes on the candidate list do not at least partially overlap the target volume; and
removing from the candidate list each of the one or more source volumes that does not at least partially overlap the target volume.

12. The method as recited in claim 11, the geometric technique comprising using a separating axis theorem technique to determine which of the multiple source volumes on the candidate list do not at least partially overlap the target volume.

13. The method as recited in claim 9, further comprising:
marking, by the hardware device and as a part of the second phase in response to determining that a sub-volume is fully overlapped by a source volume, the sub-volume as being fully overlapped;
generating a tree structure having a first node in a top layer and multiple additional nodes in each of multiple additional layers, the first node corresponding to the target volume, and each of the multiple additional nodes corresponding to a sub-volume of the target volume;
the marking including setting a flag of a node in the tree structure corresponding to the sub-volume to indicate that the sub-volume is fully overlapped; and
analyzing the tree structure to determine whether all sub-volumes in target volume are marked as being fully overlapped.

14. A hardware computing device comprising:
one or more processors; and
a computer-readable storage medium having stored thereon multiple instructions that, responsive to execution by the one or more processors, cause the one or more processors to perform acts comprising:
obtaining, by the hardware computing device, multiple volumes in an environment, each volume being a 3D volume described by a 3D grid of multiple voxels;
selecting, by the hardware computing device, one of the multiple volumes to be a target volume;
identifying, by the hardware computing device, in a first phase, a candidate list of multiple source volumes;
identifying, by the hardware computing device, in a second phase, which of multiple sub-volumes of the target volume are overlapped by at least one of the source volumes in the candidate list;

marking, by the hardware computing device and as a part of the second phase in response to determining that a sub-volume is fully overlapped by a source volume, the sub-volume as being fully overlapped;

determining, by the hardware computing device, that the target volume is fully overlapped by at least one source volume volumes in response to all of the sub-volumes being overlapped by at least one source volume; and excluding, by the hardware computing device, the target volume from further processing in response to the target volume being fully overlapped by at least one source volume.

15. The computing device as recited in claim 14, the second phase including recursively separating each of one or more of the sub-volumes into multiple sub-volumes until the sub-volume can no longer be further separated into sub-volumes, the sub-volume is fully overlapped by at least one source volume, or the sub-volume is not overlapped by the source volumes.

16. The computing device as recited in claim 14, the identifying in the first phase including:
generating a sphere that contains the target volume;
generating, for each of the multiple source volumes, a sphere that contains the source volume;
determining whether the spheres that contain the one or more source volumes intersect the sphere containing the target volume; and
excluding from further processing each of the multiple source volumes that is contained in a sphere that does not intersect the sphere containing the target volume.

17. The computing device as recited in claim 16, the acts further comprising:
using, after excluding from further processing each of the one or more source volumes that is contained in a sphere that does not intersect the sphere containing the target volume, a geometric technique to determine which of the multiple source volumes on the candidate list do not at least partially overlap the target volume; and
excluding from further processing each of the multiple source volumes that does not at least partially overlap the target volume.

18. The computing device as recited in claim 17, the geometric technique comprising using a separating axis theorem technique to determine which of the multiple source volumes on the candidate list do not at least partially overlap the target volume.

19. The computing device as recited in claim 14, the second phase further including:
generating a tree structure having a first node in a top layer and multiple additional nodes in each of multiple additional layers, the first node corresponding to the target volume, and each of the multiple additional nodes corresponding to a sub-volume of the target volume;
the marking including setting a flag of a node in the tree structure corresponding to the sub-volume to indicate that the sub-volume is fully overlapped; and
analyzing the tree structure to determine whether all sub-volumes in target volume are marked as being fully overlapped.

20. The computing device as recited in claim 14, the acts further comprising:
maintaining, during the second phase, a count of voxels that are overlapped by at least one of the multiple source volumes; and
determining that all of the sub-volumes are overlapped by at least one of the multiple source volumes in response to the count of voxels being equal to a quantity of voxels in the target volume.

* * * * *